(12) United States Patent
Zverina

(10) Patent No.: US 9,181,117 B2
(45) Date of Patent: Nov. 10, 2015

(54) SYSTEM FOR BIOLOGICAL TREATMENT OF WATER AND WASTEWATER

(71) Applicant: Milan Zverina, Calgary (CA)

(72) Inventor: Milan Zverina, Calgary (CA)

(*) Notice: Subject to any disclaimer, the term of this patent is extended or adjusted under 35 U.S.C. 154(b) by 99 days.

(21) Appl. No.: 14/060,656

(22) Filed: Oct. 23, 2013

(65) Prior Publication Data

US 2014/0339156 A1  Nov. 20, 2014

(30) Foreign Application Priority Data

May 14, 2013 (CA) .................................... 2815752

(51) Int. Cl.
C02F 3/00 (2006.01)
C02F 3/10 (2006.01)
C02F 3/06 (2006.01)
C02F 3/12 (2006.01)
C02F 101/16 (2006.01)
C02F 103/06 (2006.01)

(52) U.S. Cl.
CPC . C02F 3/006 (2013.01); C02F 3/06 (2013.01); C02F 3/104 (2013.01); C02F 3/106 (2013.01); C02F 3/121 (2013.01); C02F 2101/16 (2013.01); C02F 2103/06 (2013.01); C02F 2209/001 (2013.01); C02F 2209/02 (2013.01); C02F 2209/38 (2013.01); C02F 2209/42 (2013.01); Y02W 10/15 (2015.05)

(58) Field of Classification Search
None
See application file for complete search history.

(56) References Cited

U.S. PATENT DOCUMENTS

| | | | | |
|---|---|---|---|---|
| 3,549,521 A | * | 12/1970 | Stevens | 210/607 |
| 4,407,718 A | * | 10/1983 | Pollock | 210/626 |
| 4,898,672 A | * | 2/1990 | Clifft et al. | 210/614 |
| 2003/0062305 A1 | * | 4/2003 | Khudenko | 210/603 |
| 2011/0020862 A1 | * | 1/2011 | Audebert et al. | 435/41 |

* cited by examiner

Primary Examiner — Chester Barry
(74) Attorney, Agent, or Firm — Yancy IP Law, PLLC

(57) ABSTRACT

A system and method for treatment of ammonia-containing raw water from low-temperature sources is designed to provide optimum treatment conditions, particularly temperature of the raw water in the bioreactor(s) containing nitrifying bacteria. The raw water supply is split into two streams, of which one stream is heated before remixing with the other stream. The split-stream heating is optionally supported by the provision of a retention tank on the heated-water stream. A three-way valve is provided to control compressed air supply to be mixed with the raw water in dependence on water level in the bioreactor.

3 Claims, 3 Drawing Sheets

SYSTEM FOR BIOLOGICAL TREATMENT OF WATER AND WASTEWATER

BACKGROUND OF THE INVENTION

This invention relates to a method and a system for biological treatment of water and wastewater, and particularly to a method and system for biological removal of nitrogen-containing impurities from low-temperature water and ground water.

Biological treatment of wastewater is well known. Also known are systems and methods for removal of nitrogen compounds, e.g. ammonia and other biodegradable matter from raw water supply for commercial, industrial and municipal users.

Certain raw water sources, for instance ground water sources in cold climate zones, provide raw water at a relatively low temperature, close to the freezing point (0° C. or 32° F.). At this temperature, some bacterial strains normally useful for biological degradation of water-borne impurities do not operate in an optimal manner. Nitrifying bacteria *Nitrosomonas* and *Nitrobacter* are normally not able to metabolize sufficiently at a temperature close to the water freezing point, at a temperature below approximately 5° C. On the other hand, at temperatures in the range about 5-40° C., these bacteria strains are active and degrade ammonia and other nitrogen impurities sufficiently well. The bacteria are aerobic and consume approximately 5 ppm of oxygen per 1 ppm of removed ammonia while also utilizing carbon source nutrients present in raw water.

While the relationship between bacterial efficiency, optimum temperature, oxygen and nutrient supply is known, the solutions vary depending on the source of raw water or wastewater and the scale of the systems. Specifically, there is a need for a low-cost system and method of biological treatment and purification of raw water derived from low-temperature sources such as ground water in cold climate areas, where the treatment efficiency depends in large part on the reliability of temperature control of the process.

SUMMARY OF THE INVENTION

In accordance with one aspect of the invention, there is provided a system for biological treatment of contaminated water, the system comprising: a biological reactor for contacting contaminated water with bacteria and oxygen, an air source, an air supply line connecting the air source to the biological reactor, a water supply line for supplying contaminated water from a source to the biological reactor, the water supply line split into a main stream and a partial stream, a heater installed on the partial stream for heating contaminated water to a substantially higher temperature than required for water treatment in the reactor, the main stream and the partial stream reunited downstream of the heater for mixing the main stream and the heated partial stream and supplying a resulting full stream of contaminated water to the reactor.

For controlling the temperature of the full stream, a mixing valve is provided at the point of mixing of the partial stream and the main stream. The valve is operated manually or automatically based on the temperature of the full stream in the reactor or upstream thereof.

In an embodiment of the invention, the flow of air through the air supply line is controlled by means of an air control valve. Further, an injector or an equivalent device is installed upstream of the reactor for mixing the full stream of contaminated water with the air from the air supply line.

The reactor contains a filtering medium for facilitating the contact of bacteria with the contaminated water. A water level in the reactor is maintained such that the filtering medium is fully submerged in the water. In an embodiment of the invention, the water level is controlled by a water level-control valve which functions to either stop the flow of air from the supply line to the injector when the water level in the reactor is too low due to air pressure above the water in the reactor, or allow the flow of air from the air supply line to the injector. This feature is provided to save energy needed for operating the air compressor.

Thus, in another aspect of the invention, there is provided a method of biological treatment of raw water or wastewater, the method comprising the steps of: providing contaminated water from a water source to a bioreactor which comprises biomass capable of biodegrading contaminants in the water, providing compressed air and mixing the air with the contaminated water to be treated in the bioreactor, splitting a contaminated water stream from the source into a main stream and a partial stream, heating the partial stream of contaminated water, remixing the heated partial stream with the main stream and supplying the remixed stream to the bioreactor.

In an embodiment of the invention, the method further comprises the step of controlling the flow of compressed air into the reactor in dependence upon the water level.

BRIEF DESCRIPTION OF THE DRAWINGS

The invention will be explained in more detail by way of the following description in conjunction with the drawings, in which.

DETAILED DESCRIPTION OF THE INVENTION

Figure 1:
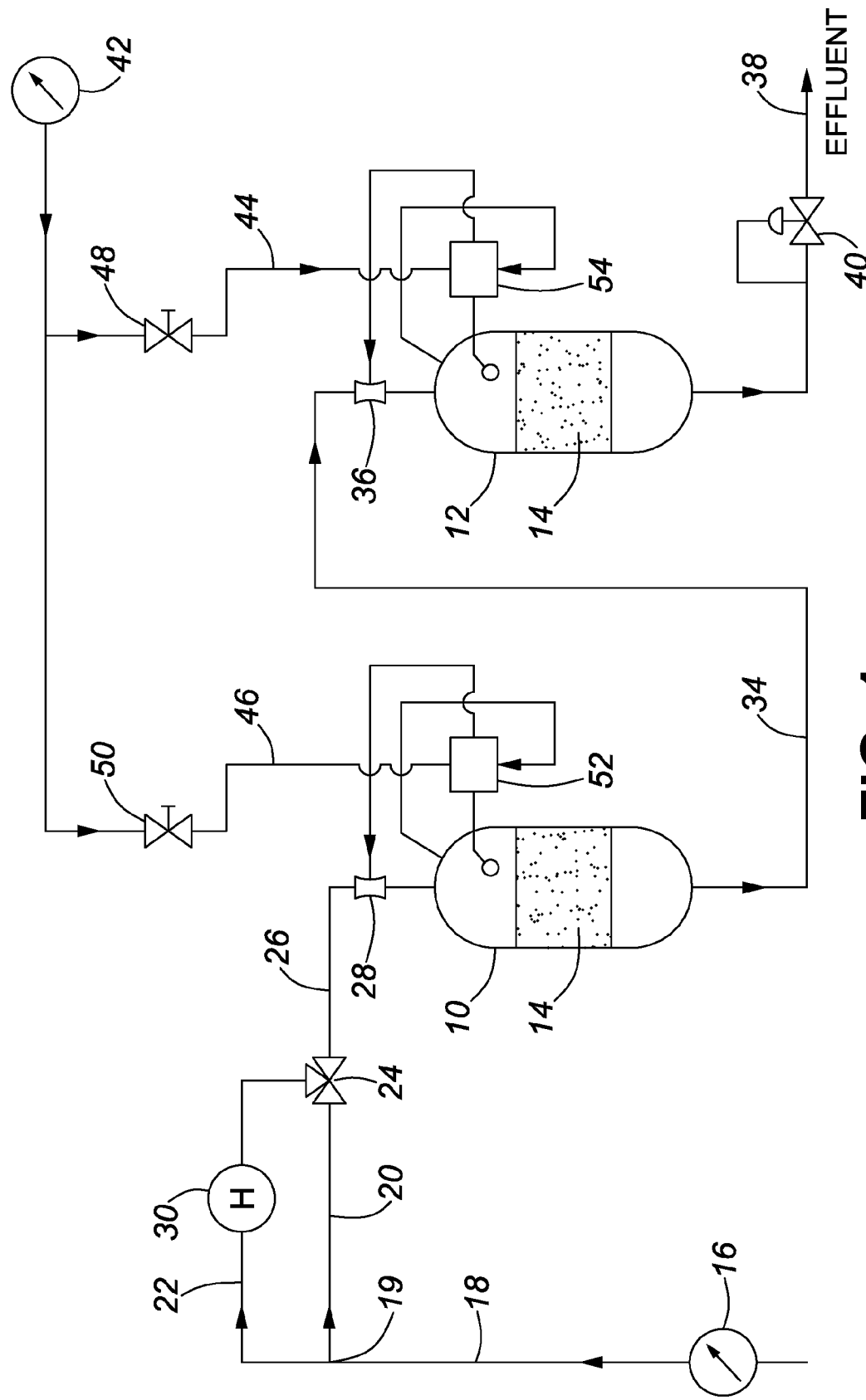
FIG. 1 is a schematic diagram of the system of the invention.

As seen in FIG. 1, the system has two identical bioreactors 10, 12 installed in series so that the effluent from the first reactor 10 is directed to the second bioreactor 12 for further treatment. Filtering medium 14 is disposed in both bioreactors, the medium well known in the art. In the embodiment described herein, the contaminant is ammonia and the biomass in the bioreactors contains commercially available bacterial cultures consisting mainly of nitrifying bacteria, *Nitrosomonas* and *Nitrobacter*. The cultures are available from Fritz Industries Inc., Mesquite, Tex., or can develop on their own in favorable conditions.

Raw water is pumped from a source, for instance a well, by means of a pump 16. The raw water is directed through a line 18 to a point 19 where the line is split into a first branch 20 and a second branch 22. The flow through the two branches 20, 22 is controlled in a well-known manner, either through the selection of their respective diameters, or nozzles or a flow control valve (not shown) such that the flow through the second branch 22 is much less than 50% of the total flow through line 18, typically 0-20%, the rest of the flow occurring through the first branch 20. The two branches are reunited at a remixing valve 24 wherefrom the raw water flow is directed over the line 26 to the first bioreactor 10 via an injector 28.

A heater, e.g. an electric or gas flow-through heater 30 is installed on the second branch 22 to heat water flowing through the second branch 22. In an embodiment of the invention, the water is heated to such a temperature to cause the combined stream in the line 26 to reach an optimum temperature for the purpose of the biological treatment in the bioreactors 10, 12.

It will be appreciated that the use of split streams for heating may allow for more efficient matching of heat supply with heat demand and better heat distribution in the stream entering the bioreactor.

Figure 2:
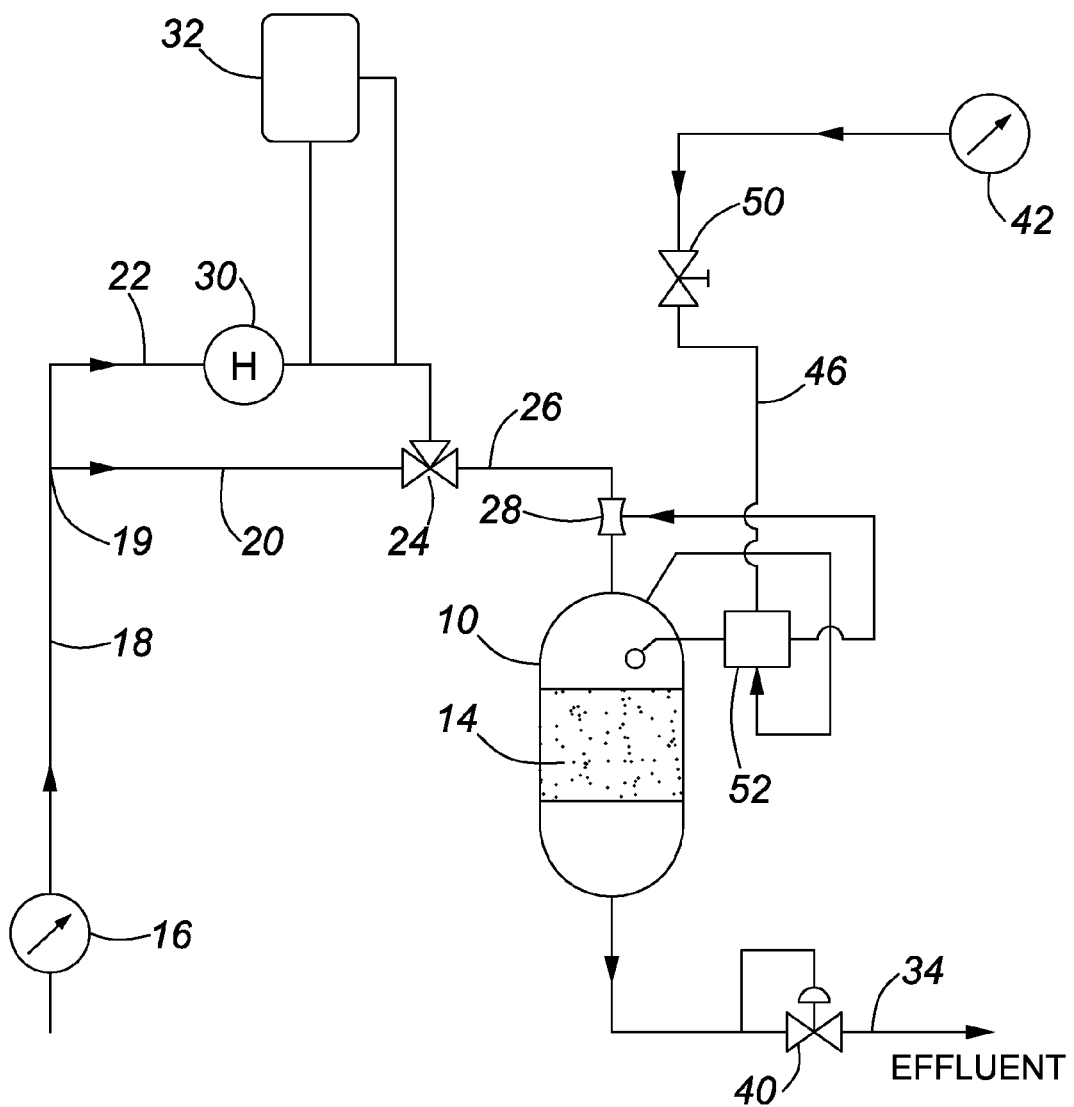
FIG. 2 is a schematic partial diagram of an alternative system of the invention.

It is usually desirable to avoid fluctuations of the temperature in the bioreactors, particularly a significant temperature drop, in order not to disturb the efficiency of the biological treatment. In an alternative embodiment of the system represented in FIG. 2, a thermally insulated retention tank 32 is installed on a shunt 22a of the branch 22 downstream of the heater 30. This provision enables, if so desired, to store an amount of heated water for supply to the bioreactors via the remixing valve 24 and line 26 in case of a temporary malfunction of the heater 30. The requisite valves associated with the tank are not shown. The optional second reactor with the associated hardware is omitted in FIG. 2.

The effluent from the first bioreactor 10 is directed via a line 34 to the injector 36 of the second bioreactor 12. The effluent from the second bioreactor 12 is directed to the end user via a line 38. A back-pressure valve 40 is installed on the line 38 to keep the required pressure within the bioreactor 12 and, to a degree, in the bioreactor 10.

An oxygen supply, required for the metabolic activity of the aerobic bacteria in the reactors 10, 12, is provided by means of air compressor 42, air supply lines 44, 46 and air flow control valves 48, 50.

The filtering medium 14 in both bioreactors, consisting of commercially available granulated activated carbon, should enable sufficient contact of the bacterial biomass with the contaminants and air. With proper settings of the air pressure and water flow through the reactors, the filtering medium should be submerged in water. However, air flow or water flow fluctuations are often encountered and the water level in either bioreactor may drop thus exposing the filtering medium which is undesirable.

Figure 3A:
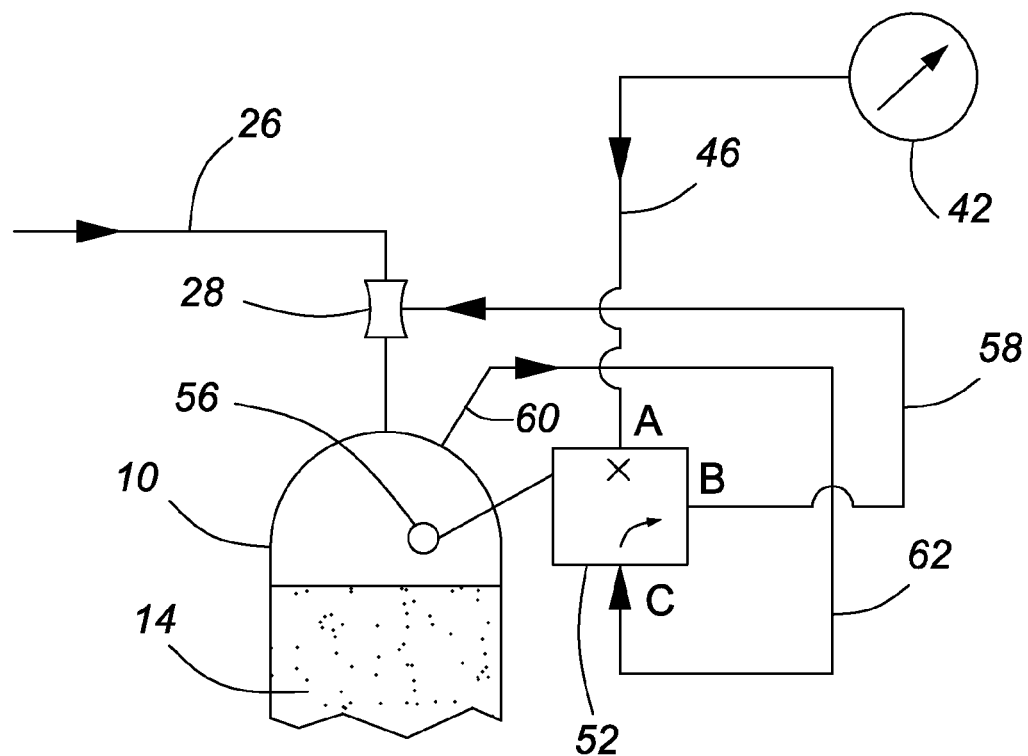
FIGS. 3a and 3b are diagrams explaining the functionality of the water level control valve.
Figure 3B:
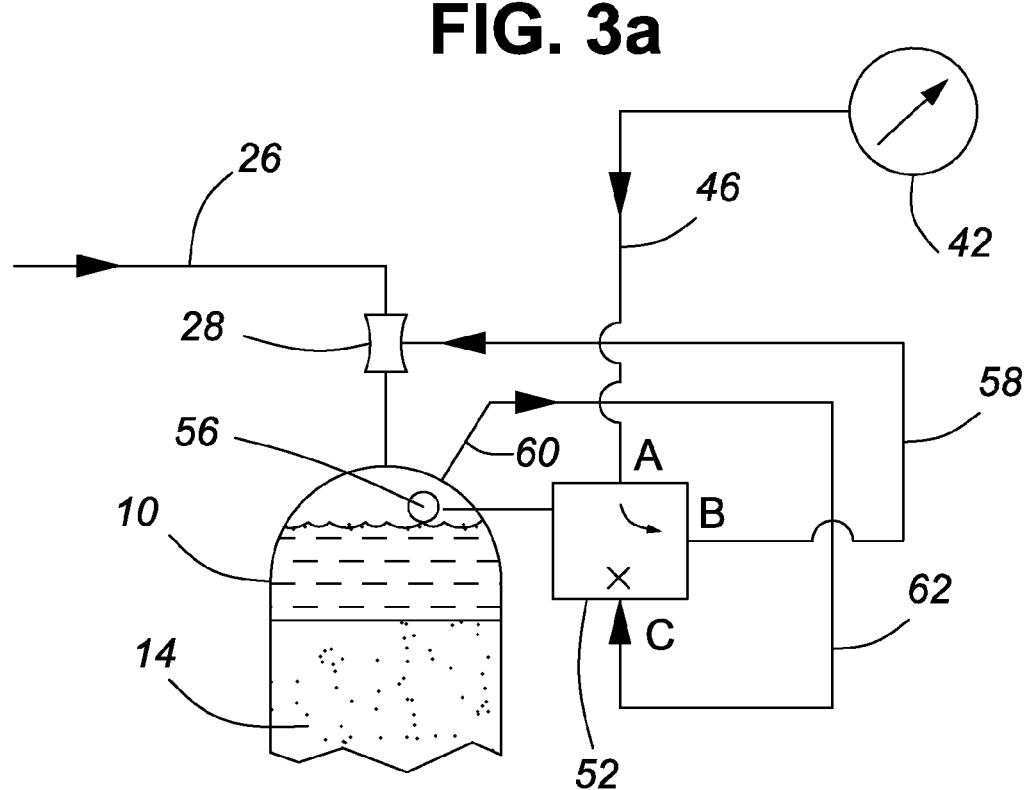

If the water level is too low, it can be raised by venting excess air from the bioreactor into the atmosphere without turning off the air compressor. When excess air is released, the water level rises because of the water pump pressure. To control the water level and avoid a waste of compressed air, the excess air can be diverted to the injector for re-injection into the water flowing into the reactor while direct air flow from the compressor into the injector is stopped until the water level rises to a predetermined level. This water level control is accomplished through the use of three-way float valves 52, 54 installed at the bioreactors 10, 12 respectively and represented in more detail in FIGS. 3a and 3b.

In operation, raw water warmed up via the heater 30 flows through the line 26 and the injector 28 into the bioreactor 10. Compressed air is supplied from the compressor 42 to be mixed with the raw water which fills the bioreactor such as to cover the filtering medium 14. The air supply is controlled in dependence on the water level in the bioreactor through the provision of a three-way float valve 52 having a float 56 and three ports A, B and C.

If (FIG. 3a) the water level falls below a predetermined level due to excess supply of compressed air, the float 56 drops whereby the port A is closed and the port C is opened (port B is always open). As a result, the flow of compressed air to the injector through the line 46, valve 52 and line 58 is stopped. The open ports B and C now enable excess undissolved air forming an air cushion above the medium 14 in the bioreactor 10 to flow through the vent 60, valve 52 and line 58 into the injector 28 to be remixed with raw water and supplied into the bioreactor.

If (FIG. 3b) the water level rises to a predetermined high level in the bioreactor, the corresponding rise of the float 56 closes the port C and opens port A. As a result, compressed air from the compressor 42 flows through line 46, ports A and B and line 58 into the injector, while flow through the line 62 is stopped.

The closure of port A will thus result in a build-up of pressure in line 46 wherein the compressor may shut down automatically.

It is desirable to maintain a predetermined positive pressure in the bioreactor(s), and this is accomplished herein by the provision of a backpressure valve 40 on the effluent line 34, 38, the valve being controlled by the pressure upstream thereof.

The system may use a number of bioreactors. Obvious variants and modifications of the embodiments described and illustrated herein will occur to those skilled in the art, and the invention is not limited by these embodiments but is to be defined by the appended claims.

The invention claimed is:

1. A system for biological treatment of contaminated water or wastewater, the system comprising:
  a biological reactor for contacting contaminated water with bacteria and oxygen,
  a compressed air source,
  an air supply line connecting the compressed air source to the biological reactor,
  a water supply line for supplying contaminated water from a source to the biological reactor, the water supply line split into a main stream and a partial stream,
  a heater installed on the partial stream for heating contaminated water, and
  a water level control valve associated with the biological reactor, the water level control valve operative to control the supply of compressed air and recirculation of undissolved air in the biological reactor for reinjection into untreated water or wastewater as a function of water level in the biological reactor,
  wherein the main stream and the partial stream are connected downstream of the heater for mixing the main stream with the heated partial stream and for supplying a resulting full stream of contaminated water to the reactor.

2. A system for biological treatment of contaminated water or wastewater, the system comprising:
  a biological reactor for contacting contaminated water with bacteria and oxygen,
  a compressed air source,
  an air supply line connecting the compressed air source to the biological reactor,
  a water supply line for supplying contaminated water from a source to the biological reactor, the water supply line split into a main stream and a partial stream,
  a heater installed on the partial stream for heating contaminated water,
  a water level control valve associated with the biological reactor, the water level control valve operative to control the supply of compressed air and recirculation of undissolved air in the biological reactor for reinjection into untreated water or wastewater as a function of water level in the biological reactor,
  an effluent line for outflow of effluent from the bioreactor and a backpressure valve mounted on the effluent line for controlling pressure within the bioreactor, and wherein the main stream and the partial stream are connected downstream of the heater for mixing the main stream with the heated partial stream and for supplying a resulting full stream of contaminated water to the reactor, wherein the biological reactor comprises a filtering medium suitable for contacting contaminated water with bacteria and oxygen and for enabling flow of contaminated water therethrough.

3. A system for biological treatment of contaminated water or wastewater, the system comprising:

a biological reactor for contacting contaminated water with bacteria and oxygen, a compressed air source, an air supply line connecting the compressed air source to the biological reactor, a water supply line for supplying contaminated water from a source to the biological reactor, the water supply line split into a main stream and a partial stream, a heater installed on the partial stream for heating contaminated water, and a retention tank connected to the partial stream downstream of the heater, wherein the retention tank is thermally insulated and wherein the main stream and the partial stream are connected downstream of the heater for mixing the main stream with the heated partial stream and for supplying a resulting full stream of contaminated water to the reactor.

\* \* \* \* \*